US007949378B2

(12) United States Patent
Liu et al.

(10) Patent No.: US 7,949,378 B2
(45) Date of Patent: May 24, 2011

(54) ROTATABLE CONNECTING MECHANISM FOR A PORTABLE ELECTRONIC DEVICE

(75) Inventors: Ye Liu, Shenzhen (CN); Hsiao-Hua Tu, Taipei Hsien (TW); Yan-Ling Gao, Shenzhen (CN); Xu-Ri Zhang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 467 days.

(21) Appl. No.: 12/146,564

(22) Filed: Jun. 26, 2008

(65) Prior Publication Data
US 2009/0188339 A1 Jul. 30, 2009

(30) Foreign Application Priority Data

Jan. 30, 2008 (CN) .......................... 2008 1 0300276

(51) Int. Cl.
*H04B 1/38* (2006.01)

(52) U.S. Cl. ............... 455/575.1; 455/575.3; 455/575.4; 455/575.8

(58) Field of Classification Search ............... 455/575.1, 455/575.3, 575.4, 575.8, 90.3
See application file for complete search history.

(56) References Cited

U.S. PATENT DOCUMENTS 7,586,538 B2* 9/2009 Cho ............................... 348/374
2004/0018862 A1* 1/2004 Godston et al. ............ 455/575.3

\* cited by examiner

*Primary Examiner* — Tuan A Pham
(74) *Attorney, Agent, or Firm* — Steven M. Reiss

(57) ABSTRACT

A rotatable connecting mechanism (100) includes a cover (10), a base (30), a toothed element (20) and an elastic element (24). The cover is rotatably mounted on the base. The toothed element is configured on a surface of the cover facing the base and includes a plurality of slots (224) defined thereon. The elastic element having an engaging portion (2422) formed thereon and configured on a surface of the base facing the cover. The engaging portion rotatably engages with the slots of the toothed element.

15 Claims, 5 Drawing Sheets

ROTATABLE CONNECTING MECHANISM FOR A PORTABLE ELECTRONIC DEVICE

CROSS-REFERENCE TO RELATED APPLICATION

This application is related to a co-pending U.S. patent application Ser. No. 12/146,566, entitled "ROTARY MECHANISM FOR PORTABLE ELECTRONIC DEVICE", by Ye Liu, et al. Such application has the same assignee as the present application and is concurrently filed herewith. The disclosure of the above-identified application is incorporated herein by reference.

BACKGROUND

1. Field of the Invention

The present invention generally relates to portable electronic devices and, particularly, to a rotatable connecting mechanism for portable electronic devices.

2. Description of Related Art

With the development of wireless communication and information processing technologies, portable mobile terminals, such as mobile phones and personal digital assistants (PDAs), are now in widespread use.

Portable electronic devices such as mobile phones mainly include bar mobile phones, folding mobile phones, sliding mobile phones, and rotatable mobile phones. Rotatable mobile phones have compact structures.

A traditional rotating mechanism for a mobile phone includes a cover, a display mounted on the cover, a base, a keypad mounted on the base, and a connecting mechanism making the cover rotatable elative to the base. The connecting mechanism is configured so the cover slides automatically to a desired position relative to the base when the cover is rotated a certain degree. When the mobile phone is closed, the cover covers the base, and the keypad is hidden underneath the cover. When the mobile phone is in use, the cover is rotated automatically to a desired position by the connecting mechanism, exposing the keypad.

However, the rotatable mechanism is configured without an intergrated mechanism. Thus when the cover rotates automatically to a desired position, the rotation may cause the mobile phone to shake, especially when the mobile phone is held by only one hand of a user. As a result, the opening/closing of the cover relative to the base is unsteady.

Therefore, a rotatable connecting mechanism that can steadily open a portable electronic device such as a mobile phone is desired.

BRIEF DESCRIPTION OF THE DRAWINGS

Many aspects of the present rotatable connecting mechanism and a portable electronic device using the same can be better understood with reference to the following drawings. The components in the various drawings are not necessarily drawn to scale, the emphasis instead being placed upon clearly illustrating the principles of the present rotatable connecting mechanism and a portable electronic device using the same. Moreover, in the drawings, like reference numerals designate corresponding parts throughout the diagrams.

DETAILED DESCRIPTION OF THE INVENTION

Figure 1:
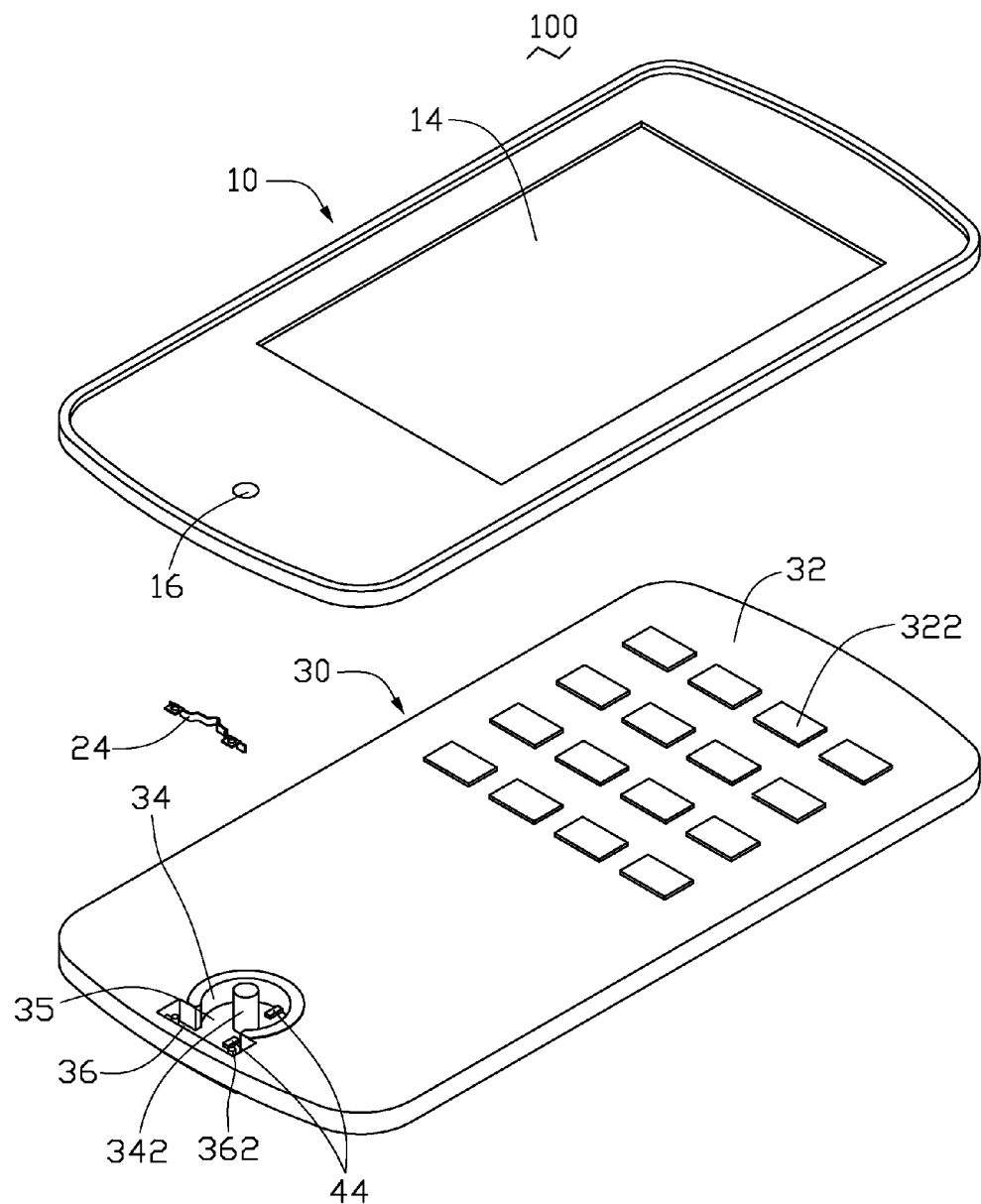
FIG. 1 is an exploded schematic view of the rotatable connecting mechanism, according to an exemplary embodiment.
Figure 2:
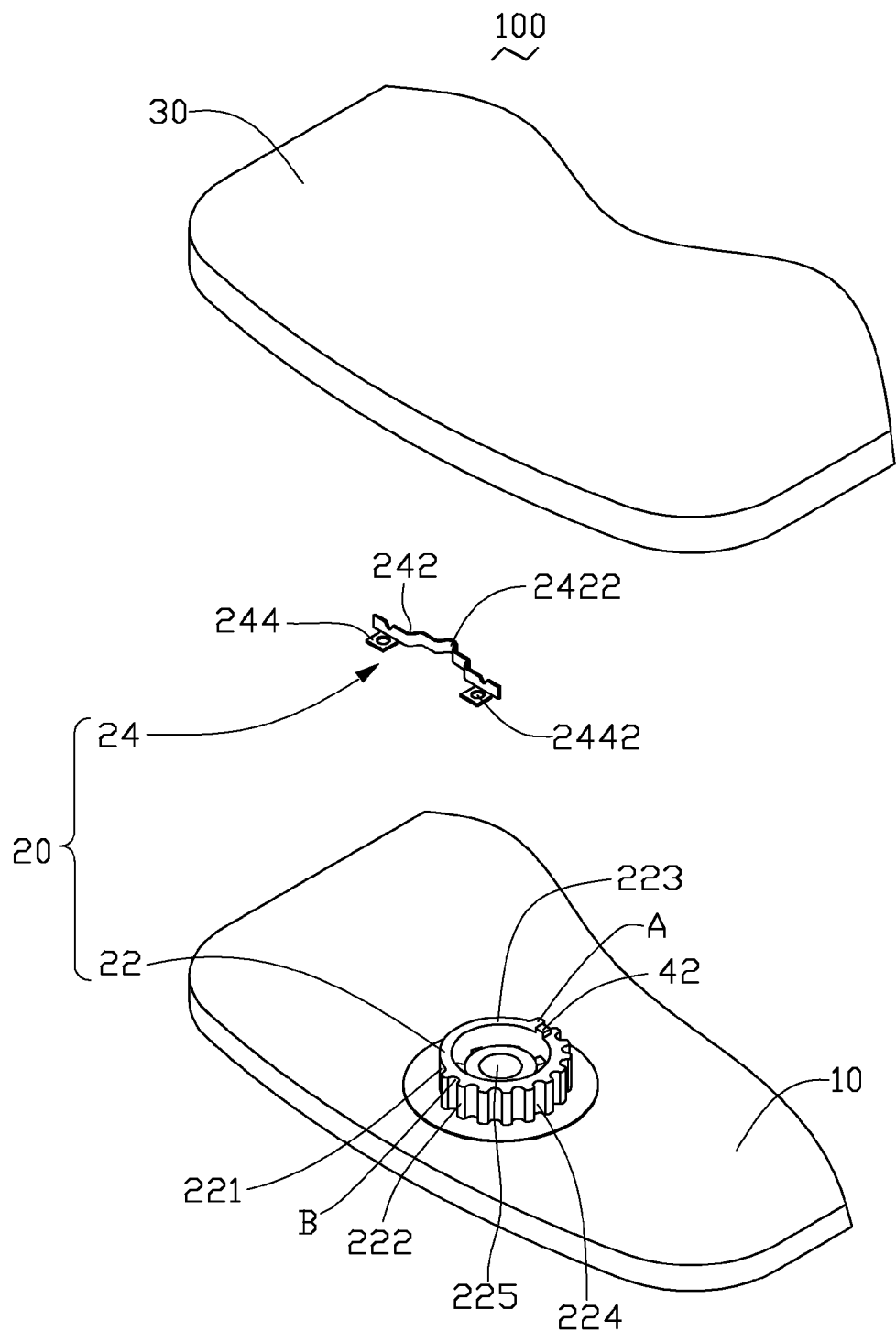
FIG. 2 is a partly exploded schematic view of the rotatable connecting mechanism shown in FIG. 1 viewed from another aspect.
Figure 3:
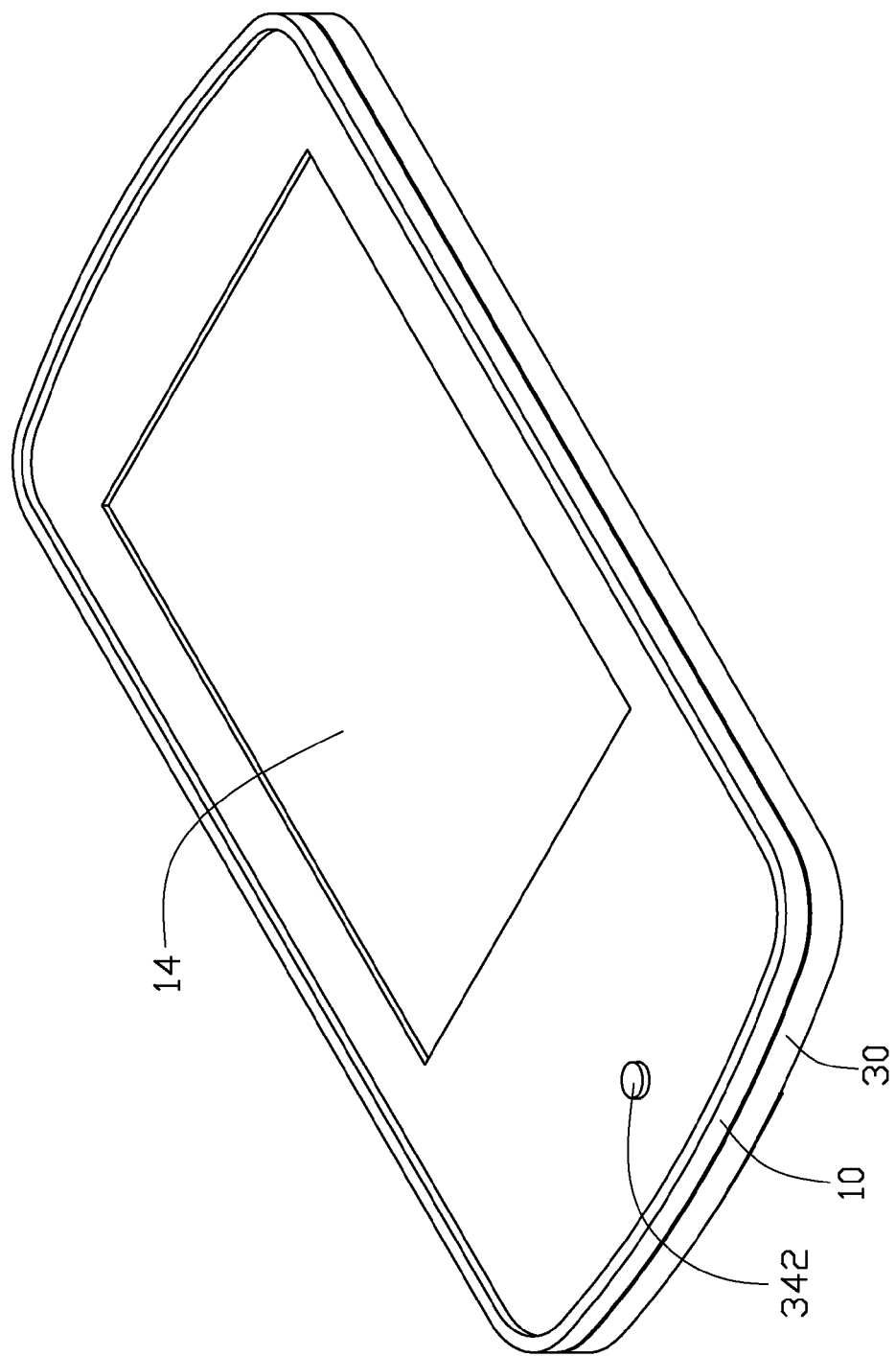
FIG. 3 is an assembled schematic view of the rotatable connecting mechanism shown in FIG. 1.

The present rotatable connecting mechanism is suitable for a portable electronic device with a rotary structure, such as a rotatable mobile phone. Referring to FIGS. 1 and 2, a rotatable connecting mechanism 100 includes a cover 10, an engaging unit 20 and a base 30 connected with the cover 10 by the engaging unit 20. The cover 10 can be rotated about the engaging unit 20 relative to the base 30.

A display screen 14 adjacent to an end of the cover 10 displays information of the portable electronic device. An engaging hole 16 is defined through the other end of the cover 10 for engaging the base 30.

The engaging unit 20 includes a round, toothed element 22 fixed on the cover 10 and an elastic sheet 24 engaging with the toothed element 22. The toothed element 22 includes a peripheral wall 221 and a plurality of teeth 222 protruding from a peripheral wall 221 and forming an arc. A plurality of slots 224 are formed between adjacent teeth 222. An angle between two teeth 222 on both ends of the arc corresponds to a desired angle that the cover 10 should rotate relative to the base 30. For example, when the cover 10 is desired to rotate 360 degrees relative to the base 30, the teeth 222 are provided around the whole peripheral wall 221 of the toothed element 22. When the cover 10 is desired to rotate 180 degrees relative to the base 30, the teeth 222 are provided around half of the peripheral wall 221 of the toothed element 22.

A limiting hole 225 is defined in the center of the toothed element 22 corresponding to the engaging hole 16. The limiting hole 225 corresponds in shape and size to the engaging hole 16. The limiting hole 225 defined in the toothed element 22 is connected and communicates with the engaging hole 16.

The elastic sheet 24 includes a main body 242 and a pair of connecting portions 244. The main body 242 is an arched sheet with an engaging portion 2422 formed in the middle thereof. The engaging portion 2422 meshes with the toothed element 22 so the engaging portion 2422 can engage the slots 224 of the toothed element 22. The connecting portions 244 are respectively extended vertically from both ends of the main body 242. In present embodiment, the connecting portion 244 is a rectangular sheet with a locking hole 2442 defined therethrough. The locking hole 2442 is configured for attaching the elastic sheet 24 to the base 30.

A keypad 322 in the base 30 and facing the cover 10 allows inputting information. A groove (not labeled) is defined in the base 30 for receiving the toothed element 22 and the elastic sheet 24. The groove includes a first receiving groove 34 for receiving the toothed element 22 and a second receiving groove 36 for receiving the elastic sheet 24. The first receiving groove 34 and the second receiving groove 36 communicate with each other and are formed by a bottom wall 35 and a sidewall (not labeled).

A shape of the first receiving groove 34 corresponds to that of the toothed element 22. In the exemplary embodiment, the first receiving groove 34 is round. A post 342 formed on the bottom wall 35 of the first receiving groove 34 cooperates with the limiting hole 225. The post 342 is inserted through the limiting hole 225 and the engaging hole 16, so the cover 10 can rotate relative to the base 30 with the post 342 as an axis.

The second receiving groove 36 is a rectangular slot defined on one side of the first receiving groove 34. Two fixing portions 362 are formed on the bottom wall 35 of the second receiving groove 36 corresponding to the connecting portions 244 of the elastic sheet 24. In present embodiment, the two fixing portions 362 are two posts. The two fixing portions 362 are inserted through the locking hole 2442 and connect with the elastic sheet 24 by adhesive, so the elastic sheet 24 is fixed in the second receiving groove 36.

Figure 4:
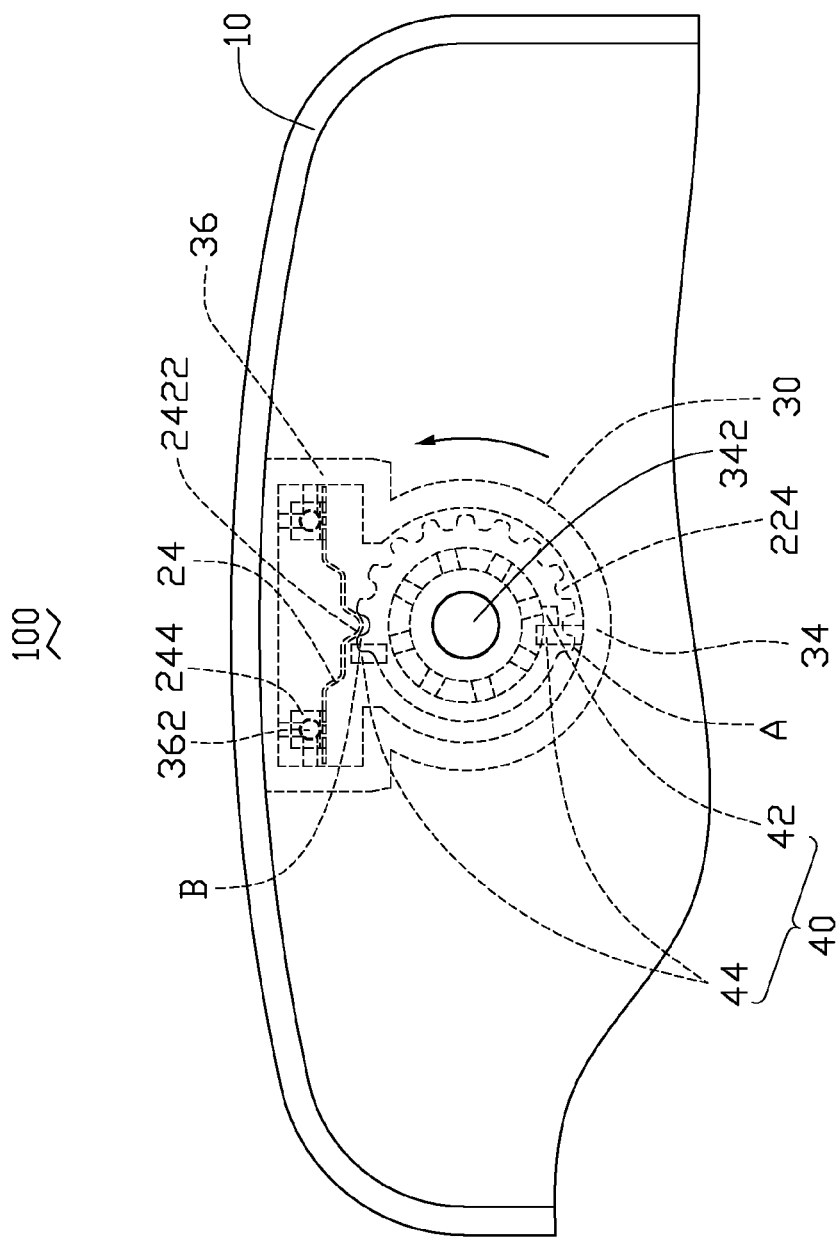
FIG. 4 is a partly perspective view of the rotatable connecting mechanism shown in FIG. 3.
Figure 5:
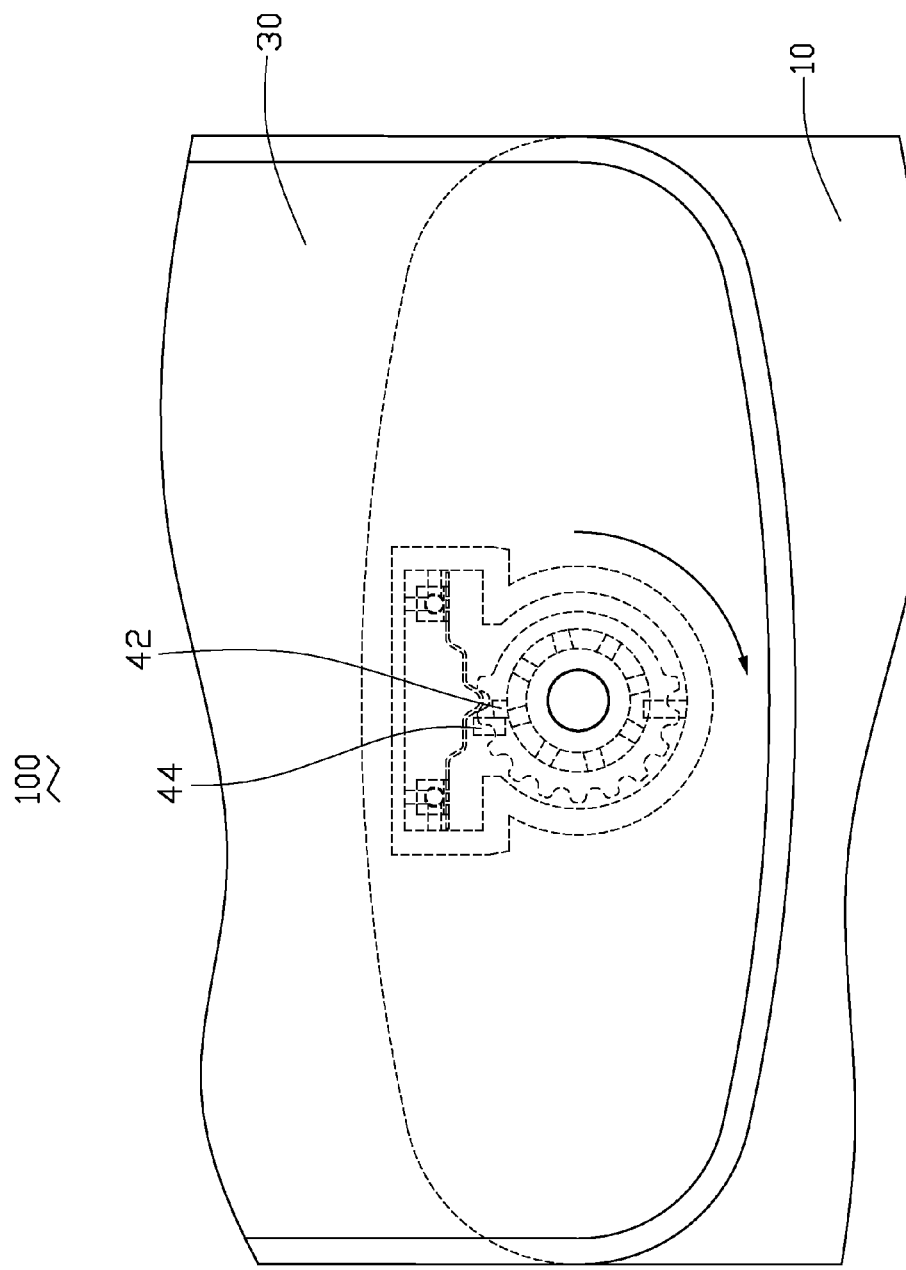
FIG. 5 is a partly perspective view of the rotatable connecting mechanism shown in FIG. 4 with a cover rotated away from a base.

Referring to FIGS. 1 and 4-5, if the cover 10 is desired to rotate relative to the base 30 for an angle less than 360 degrees, a first stopper portion 42 is formed on an end surface 223 of the toothed element 22 facing the base 30. The stopper portion 42 is a block formed close to the end A of the plurality of slots 224. Two second stopper portions 44 are formed on the bottom wall 35 of the first receiving groove 34. When one of the second stopper portion 44 contacts with the first stopper portion 42, the other second stopper portion 44 is close to the end B of the plurality of the slots 224. The first stopper portion 42 and the two second stopper portions 44 cooperatively form a stopper mechanism 40 between the toothed element 22 and the base 30 for applying a stopping force when the cover 10 rotates relative to the base 30 at the desired angle.

When assembled, the toothed element 22 is fixed to the cover 10. The connecting portions 244 of the elastic sheet 24 is matingly engaged with the fixing portions 362 so the elastic sheet 24 is fixed to the base 30. The post 342 is inserted through the limiting hole 225 in the toothed element 22 and the engaging hole 16. The engaging portion 2422 of the elastic sheet 24 engages the slots 224 of the toothed element 22.

Referring to FIGS. 4 and 5, when the first stopper portion 42 of the toothed element 22 contacts one of the second stopper portion 44, the cover 10 and the base 30 are closed. When the cover 10 is rotated along the direction pointed by the arrow in FIG. 4, the engaging portion 2422 of the elastic sheet 24 rotatably engages with the plurality of slots 224 of the toothed element 22 until the first stopper portion 42 contacts the other second stopper portion 44, and then the keypad 322 of the base 30 is revealed, and the portable electronic device with the rotatable connection mechanism 100 can be used. When the cover 10 is needed to be closed, the cover 10 is rotated along the direction pointed by the arrow in FIG. 5.

It should be understood that, the toothed element 22 and the cover 10 is connected by adhesive. However, the toothed element 22 and the cover 10 can also be formed as a single unit.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A rotatable connecting mechanism, comprising:
    a base;
    a cover rotatably mounted on the base;
    a toothed element on a surface of the cover, facing the base and including a plurality of slots defined thereon; and
    an elastic sheet including a main body with an engaging portion formed in the middle thereof configured on a surface of the base facing the cover, the engaging portion rotatably engaging the slots of the toothed element, a connecting portion extending from each end of the main body, and a second receiving groove having a bottom wall, the bottom wall defined in the surface of the base facing the cover, two fixing portions formed on the bottom wall of the second receiving groove; the elastic sheet received in the second receiving groove, and each connecting portion fixed in one of the fixing portions.

2. The rotatable connecting mechanism as claimed in claim 1, wherein the toothed element is round, and a plurality of teeth protruding from a peripheral wall of the toothed element form an arc and a plurality of slots between adjacent teeth, the angle between two protrusions at the ends of the arc correspond to a desired angle that the cover should rotate relative to the base.

3. The rotatable connecting mechanism as claimed in claim 2, wherein an engaging hole is defined in the cover, a limiting hole is defined in the toothed element, and a post formed on the base is inserted through the limiting hole and the engaging hole, the cover rotating relative to the base with the post as an axis.

4. The rotatable connecting mechanism as claimed in claim 3, wherein a first receiving groove having a bottom wall is defined in the surface of the base facing the cover, a post protrudes from the bottom wall, and the toothed element is received in the first receiving groove.

5. The rotatable connecting mechanism as claimed in claim 3, wherein the cover includes a display adjacent to on one end of the cover, the engaging hole adjacent the other end of the cover and for engaging the base.

6. The rotatable connecting mechanism as claimed in claim 1, wherein each connecting portion has a locking hole defined therethrough, each fixing portion comprises a post inserted in one of the locking holes.

7. The rotatable connecting mechanism as claimed in claim 1, wherein a stopper mechanism is formed between the toothed element and the base for stopping the cover from rotating relative to the base by more than a desired angle.

8. The rotatable connecting mechanism as claimed in claim 7, wherein the stopper mechanism includes a first stopper portion protruding from an end surface of the toothed element facing the base and close to one end of the plurality of slots, and two second stopper portions formed on the bottom wall of the first receiving groove; when one of the second stopper portion contacts the first stopper portion, the other stopper portion is close to the other end of the plurality of the slots.

9. A portable electronic device, comprising:
    a base having a keypad configured thereon;
    a cover rotatably mounted on the base and including a display screen adjacent to one end thereof;
    a toothed element on a surface of the cover, facing the base and including a plurality of slots spaced with each other defined thereon; and
    an elastic sheet including a main body with an engaging portion formed in the middle thereof configured on a surface of the base facing the cover, the engaging portion rotatably engaging the slots of the toothed element each connecting portion extending from each end of the main body, and a second receiving groove having a bottom wall, the bottom wall defined in the surface of the base facing the cover, two fixing portions formed on the bottom wall of the second receiving groove; the elastic sheet received in the second receiving groove, and the each connecting portion fixed in one of the fixing portions.

10. The portable electronic device as claimed in claim 9, wherein the toothed element is round, and a plurality of teeth protruding from a peripheral wall of the toothed element form an arc and a plurality of slots between adjacent teeth, the angle between two protrusions at the ends of the arc correspond to a desired angle that the cover should rotate relative to the base.

11. The portable electronic device as claimed in claim 10, wherein an engaging hole is defined on the other end of the cover for engaging with the base, a limiting hole is defined in the toothed element, and a post formed on the base is inserted through the limiting hole and the engaging hole, the cover rotating relative to the base with the post as an axis.

12. The portable electronic device as claimed in claim 11, wherein a first receiving groove having a bottom wall is defined in the surface of the base facing the cover, a post protrudes from the bottom wall, and the toothed element is received in the first receiving groove.

13. The portable electronic device as claimed in claim 9, wherein each connecting portion has a locking hole defined therethrough, each fixing portion comprises a post being inserted in one of the locking holes.

14. The portable electronic device as claimed in claim 9, wherein a stopper mechanism is formed between the toothed element and the base stopping the cover from rotating relative to the base by more than a desired angle.

15. The portable electronic device as claimed in claim 14, wherein the stopper mechanism includes a first stopper portion protruding from an end surface of the toothed element facing the base and close to one end of the plurality of slots, and two second stopper portions formed on the bottom wall of the first receiving groove; when one of the second stopper portion contacts the first stopper portion, the other stopper portion is close to the other end of the plurality of the slots.

* * * * *